March 27, 1956  R. C. RUSSELL  2,739,494
POWER TRANSMITTING MECHANISMS
Filed Feb. 27, 1953  2 Sheets-Sheet 1

INVENTOR.
ROBERT C. RUSSELL
BY Hudson, Boughton,
Williams, David & Hofmann.
ATTORNEYS

United States Patent Office 2,739,494
Patented Mar. 27, 1956

2,739,494

POWER TRANSMITTING MECHANISMS

Robert C. Russell, South Euclid, Ohio

Application February 27, 1953, Serial No. 339,422

3 Claims. (Cl. 74—677)

This invention relates to power transmitting mechanisms, and more especially to transmissions of the combined rotary fluid torque converter and mechanical gear train type.

An object of the invention is to provide an improved transmission of this combined type in which the fluid torque converter embodies a plurality of turbines and in which reduction gearing of a very simple and practical form is associated with such turbines.

A further object is to provide an improved transmission of this character in which certain gear members of the reduction gearing are supported by coaxial shafts with which the respective turbines are connected, and in which other gear means meshing with such certain gears has a controlled movement therearound.

Still another object is to provide an improved transmission of the character above mentioned in which such other gear means constitutes one or more cluster gears supported by supporting means for rotation about their axes and for revolution about the gear members of the coaxial shafts.

Yet another object is to provide such an improved transmission in which one-way brake means holds the supporting means against reverse rotation.

As a further object, this invention provides such an improved transmission in which the turbines include high-speed and low-speed turbines and in which the coaxial shafts include a hollow shaft connected with the high-speed turbine and a through output shaft member connected with the low-speed turbine.

It is, likewise, an object of this invention to provide an improved transmission of the character indicated above in which one of the turbines, preferably the low-speed turbine, is connected with its shaft by releasable clutch means.

Additionally, this invention provides an improved transmisison of the character above mentioned in which the reaction means of the torque converter and the supporting means of the reduction gearing are inhibited against reverse rotation by the same holding means.

The invention can be further briefly summarized as consisting in certain novel combinations and arrangements of parts hereinafter described in detail and particularly set out in the claims hereof.

In the accompanying sheets of drawings, forming a part hereof:

Figure 1:
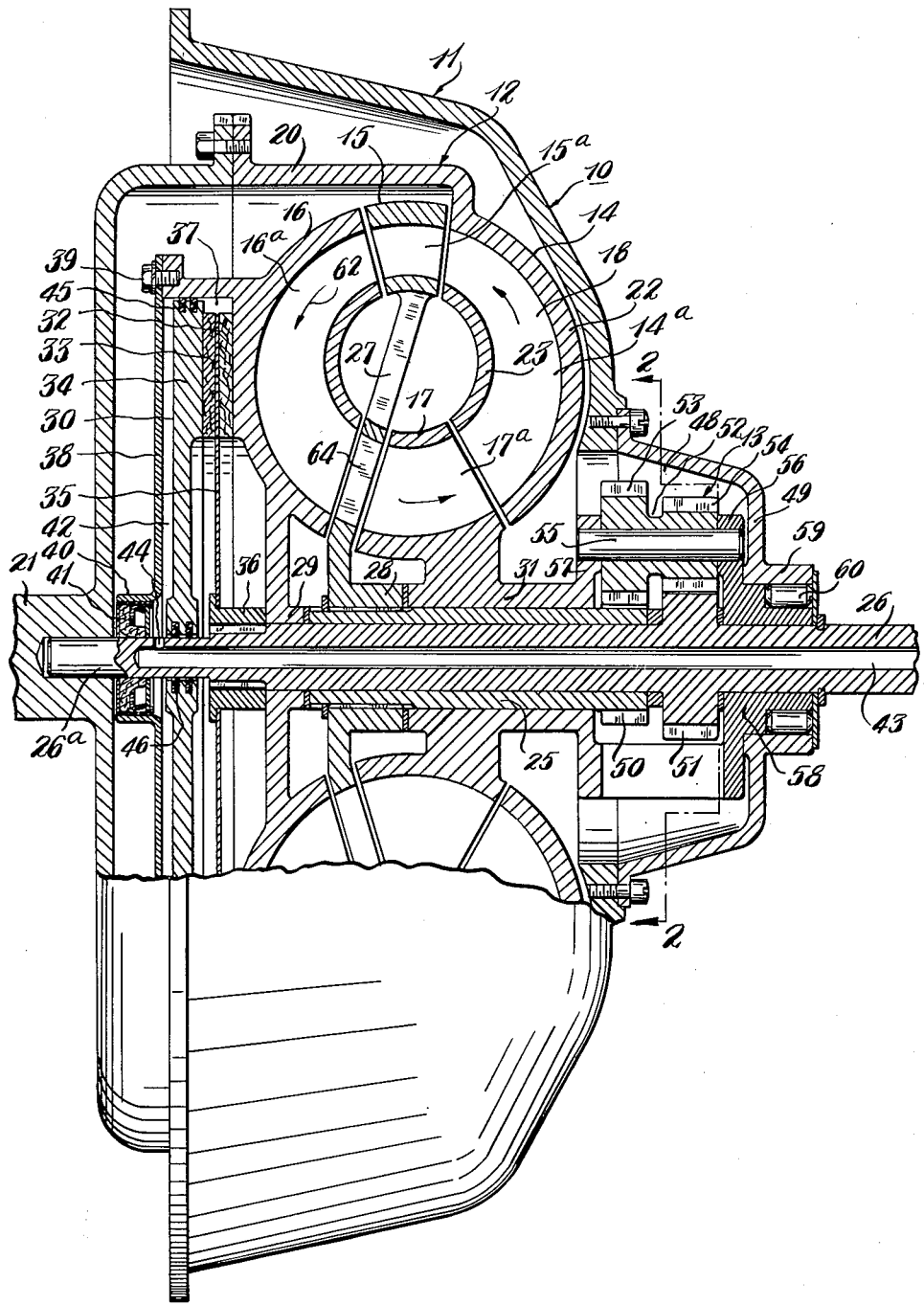
Fig. 1 is a view mainly in longitudinal vertical section and showing a power transmitting mechanism embodying this invention.
Figure 2:
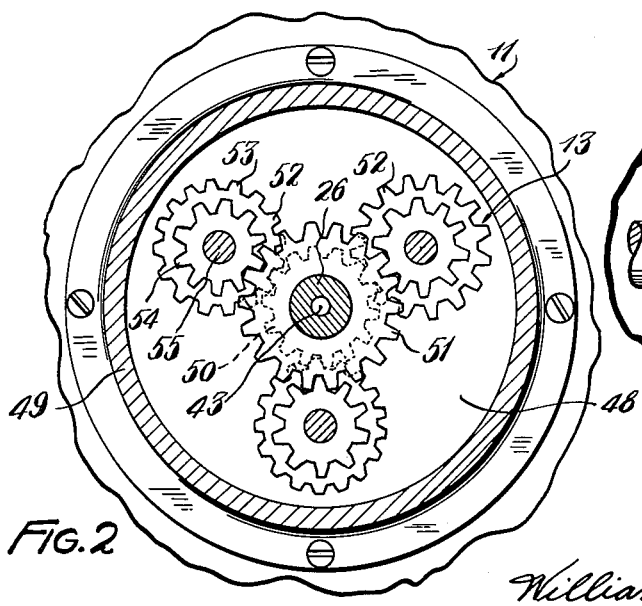
Fig. 2 is a transverse section taken through the mechanism of Fig. 1 substantially as indicated by the section line 2—2 thereof.

As representing one practical embodiment of the present invention, Figs. 1 and 2 of the drawings show a power transmitting mechanism 10 which comprises, in general, a stationary outer housing 11, a torque amplifying device or converter 12 of the toroidal fluid circuit type and a mechanical gear train constituting a reduction gearing 13 associated with such torque converter.

The torque converter 12 comprises a group of relatively rotatable bladed annular members 14, 15, 16 and 17 in cooperating relation and defining a toroidal fluid path or circuit passage 18 interiorly of this device. The member 14 of this group is a pump member carrying a group of circumferentially spaced vanes 14$^a$ and is adapted to be driven by a power input member 20 which is here shown as being a flywheel driven by an input shaft 21. The annular member 15 is a first or high-speed turbine member carrying an annular group of vanes 15$^a$. The annular member 16 is a second or low-speed turbine member carrying a group of annularly spaced vanes 16$^a$. The annular member 17 is a rotatable reaction member carrying a group of vanes 17$^a$. As is usual in devices of this kind the annular members 14, 15, 16 and 17 are constructed with spaced apart transversely curved outer and inner annular walls 22 and 23 and with the vanes of these members connecting such walls and extending across the space therebetween.

The torque converter 12 also comprises output shaft means including a first or hollow outer shaft 25 and a second or through inner shaft 26 which extends through and is rotatable in the hollow shaft. The through inner shaft 26 constitutes the output shaft member which is adapted to be connected with a load or mechanism to be driven.

The first or high-speed turbine 15 is connected with the first or hollow shaft 25 by means of a group of circumferential- 16 spaced spider arms 27 and a hub 28 at the inner end of the spider arms and which is splined to the hollow shaft adjacent the inner or forward end thereof. The second or low-speed turbine 16 is supported for rotation by a hub portion 29 journalled on the projecting inner end portion 26$^a$ of the through shaft member 26 and is connected with such inner end portion of this shaft through releasable clutch means 30 which will presently be described in detail. The reaction member 17 is rotatably supported by a hub member 31 which is journalled on the hollow shaft 25.

The clutch 30 comprises a pair of annular clutch linings 32 and 33, which are connected respectively with the second turbine 16 and a pressure plate 34, and a clutch disk 35 having the peripheral portion thereof extending between such disks. The clutch disk 35 is carried by a hub member 36 which is splined to the projecting inner end portion 26$^a$ of the through shaft 26. The pressure plate 34 and the clutch disk 35 are located in a clutch chamber 37 defined by a forwardly projecting hollow portion of the turbine 16 and closed by a cover 38 secured to such projection by suitable screws 39. The forwardly projecting portion 26$^a$ of the through shaft 26 extends through a central sleeve portion 40 of the cover and is sealed in such opening by a suitable packing 41.

The clutch 30 is usable with a "kick down" system to provide for obtaining high torque amplification for pass-by acceleration, or for other particular situations, as is more fully explained in earlier Patent 2,616,309, granted November 4, 1952.

The pressure plate 34 is axially shiftable in the clutch chamber 37 for applying pressure to the clutch disk 35 between the friction linings 32 and 33. The pressure plate 34 is shifted in a direction to engage the clutch disk 35 by an actuating force in the form of a hydraulic pressure fluid acting in the space 42 between the pressure plate and the cover 38. Hydraulic actuating fluid from an available pressure source is supplied to the space 42 through the axial and radial passages 43 and 44 of the inner shaft 26.

Leakage of such pressure fluid out of the space 42 around the outer periphery of the pressure plate 34 is prevented by suitable packing means 45 carried by such outer periphery. Leakage of fluid between the pressure plate 34 and the shaft portion 26ª is prevented by suitable packing means 46 carried by the pressure plate and engaging this shaft portion.

The reduction gearing 13 is located in a gear chamber 48 defined by a housing member 49 which surrounds the output shaft member 26 and is secured to the main housing member 11. The reduction gearing 13 comprises a pair of gear members 50 and 51 of different pitch diameters lying in adjacent parallel planes and connected with the shafts 25 and 26. The gear member 50 is fixed on the hollow shaft 25 adjacent the rear end thereof and the gear member 51 is fixed on the portion of the shaft 26 which extends through the gear chamber 48.

The gear train 13 also comprises a plurality of cluster gears 52 disposed in circumferentially spaced relation around the gear members 50 and 51. The cluster gears 52 each comprise a pair of coaxially connected gear members 53 and 54 which are in meshing engagement, respectively, with the gear members 50 and 51. The cluster gears 52 are supported for rotation about their own axes by a carrier means comprising pivot pins 55 mounted in a pair of axially spaced supporting members 56 and 57. As shown in Figs. 1 and 2, the gear members 53 and 54 cooperate with the gear members 50 and 51 so as to constitute a gear train through which the hollow shaft 25 is connected with the output shaft member 26 at a torque amplifying ratio of, for example, approximately 2 to 1. The gear train 13 could be of a torque amplification ratio other than 2 to 1, such as a higher ratio which would be desirable for high starting torque for heavy loads.

The supporting member 56 is rotatably mounted by having its hub portion 58 journalled on the shaft member 26 and rotatable in the hollow hub portion 59 of the housing member 49. The supporting member 57 is here shown as being connected with the supporting member 56 through the pivot pins 55 and also as being connected with the reaction member 17 by being formed as an integral part of the hub 31 of the latter.

When torque is being transmitted from the hollow shaft 25 through the gear train 13 to the output shaft member 26, while the latter is connected to a load to be driven, the cluster gears 52 have a tendency to roll on and revolve around the gear members 50 and 51 in a reverse direction. To prevent such reverse rotary movement of the supporting members 56 and 57, a holding means is provided which is here shown as being a one-way brake 60 located between the hub portion 58 of the supporting member 56 and the hub portion 59 of the housing member 49. The one-way brake 60 also serves as a holding means for the reaction member 17 as is further explained hereinafter.

As is understood by those skilled in the art pertaining to fluid torque converters, the vanes of the cooperating relatively rotatable members 14, 15, 16 and 17 of the torque converter 12, are provided in such number and location and are of such configuration and slope that this device will function as a speed reducing and torque amplifying means when the pump member 14 is driven by the input shaft 21. During such rotation of the pump member 14, the vanes 14ª thereof cause a velocity stream of fluid to travel around the toroidal fluid passage 18 in the direction indicated by the arrows 62. The velocity fluid thus discharged by the vanes of the pump 14, first acts on the vanes 15ª of the first turbine 15 and subsequently acts on the vanes 16ª of the second turbine 16, after which the fluid returns to the pump member past the vanes 17ª of the reaction member 17.

In the operation of the power transmitting mechanism 10, the velocity fluid delivered by the pump member 14 when the load with which the output shaft member 26 is connected is in an initially static condition, will cause the first turbine 15 to quickly accelerate to a relatively high rate of speed. At the time of this static load condition, torque will usually be developed only by the first turbine 15 and will be supplied thereby to the hollow shaft 25 from which it will be transmitted through the reduction gearing 13 to the output shaft member 26. Under such static load condition, the torque amplification which will be produced in the converter 12 by the high-speed operation of the first turbine 15 can be, for example, at a ratio of approximately 2 to 1. Since the torque amplification produced in the gear train 13 is likewise at approximately a 2 to 1 ratio, the overall torque amplification for the mechanism 10 under such a static load condition will be at approximately a 4 to 1 ratio between the input shaft 21 and the output shaft member 26.

As starting motion is imparted to the load by this initial high torque being supplied by the first turbine 15, the velocity stream of fluid leaving the vanes 15ª of the first turbine acts on the vanes 16ª of the second turbine 16, causing the latter turbine to pick up speed and to begin to deliver torque to the load directly through the output shaft member 26, assuming, of course, that the clutch 30 has been engaged. As the delivery of torque by the second turbine 16 increases during this starting motion period, the delivery of torque by the first turbine 15 decreases and the value of amplified torque delivered by the gearing 13 likewise decreases.

When the torque requirement of the load falls below an approximate 2 to 1 torque amplification ratio, the reduction gearing 13 will be substantially ineffective and all of the torque requirement of the load will then be supplied by the second turbine directly through the output shaft member 26. When this condition of operation occurs, the cluster gears 52 of the gear train 13 will merely roll idly around the gear members 50 and 51 in a forward direction. This idle movement of the cluster gears 52 is permitted by the one-way brake 60 which, at the same time, permits the reaction member 17 to run free.

As the speed of the second turbine 16 continues to increase, the amplification ratio of the torque being delivered by this turbine directly to the shaft member 26 decreases further and, when the cruising load condition of the transmission 10 is reached, the turbines 15 and 16 operate at approximately the same speed of rotation as the pump member 14 whereupon the torque converter 12 functions merely as a fluid coupling with a one-to-one drive ratio being established between the input shaft 21 and the output shaft member 26.

With respect to the mounting for the first turbine 15, it will be observed from the drawings, that spider arms 27 extend substantially diametrically of the torque converter 12 with portions of such arms spanning the fluid passage 18. At the points where the spider arms 27 span this fluid passage, they are constructed in the form of blades 64 which are of such shape or configuration as to minimize the disturbance or turbulence produced thereby in the stream of fluid traversing the passage.

From the construction above described for the power transmitting mechanism 10, it will be seen that the multiple turbines of the torque converter 12, in combination with the reduction gearing 13, provide a very simple and compact mechanism for transmitting torque from an input shaft to an output shaft over a wide range of torque amplification ratios, and particularly with a desired high amplification ratio for a low starting speed of the load. It will also be seen that with respect to the gear train 13, in which the cluster gears 52 are supported for rotation about their axes and also for revolution about the gear members 50 and 51, any desired number of these cluster gears can be used in annularly spaced relation, such that this portion of the mechanism can readily be made rugged and durable for carrying torque loads of any desired value.

Figure 3:
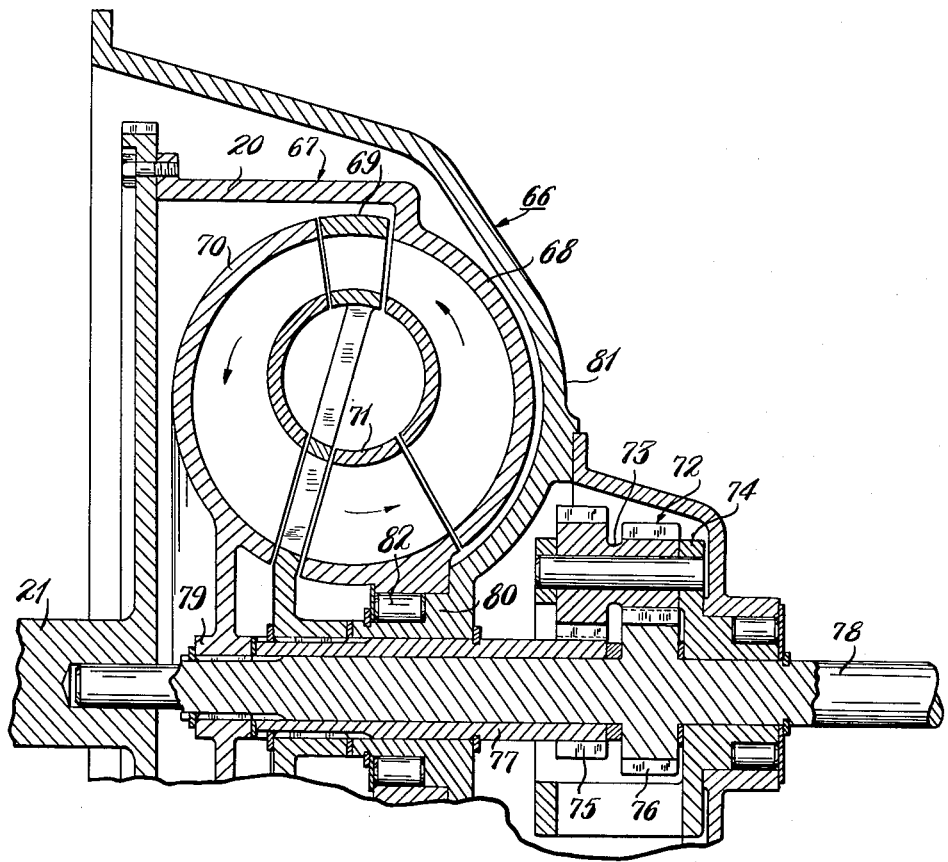
Fig. 3 is a partial longitudinal vertical section taken through such a power transmitting mechanism, but showing a modified construction.

Figure 3 of the drawings shows a power transmitting mechanism 66 which is generally similar to the above-described mechanism 10, but which is relatively more simplified. The mechanism 66 is similar to the mechanism 10 in that the torque converter 67 thereof includes a pump member 68, first and second turbines 69 and 70 and a reaction member 71. The power transmitting mechanism 66 is also similar to the mechanism 10, in that it embodies a mechanical gear train 72 which includes cluster gears 73 supported by a supporting member 74 for rotation about their axes and for revoluble movement about a pair of gear members 75 and 76 with which the respective turbines 69 and 70 are connected through the hollow shaft 77 and the output shaft 78. The supporting member 74 is held against reverse rotary movement by the one-way brake 60ª which permits the supporting member to rotate freely in a forward direction during the idling of the gear train 72.

In the modified power transmitting mechanism 66, the clutch 30 has been omitted and the second turbine 70 is connected with the output shaft member 78 by having its hub portion 79 splined directly thereto. In this modified transmission, the reaction member 71 is rotatably supported by journal means 80 of the stationary outer housing 81 and is inhibited against reverse rotation by a one-way brake 82. In other respects, the transmission 66 is similar to the transmission 10 and functions in a generally similar manner, with the exception that reaction member 71 is controlled by its own one-way brake 82 and is capable of a free floating movement independently of the free floating movement of the supporting member 74 of the gear train 72.

At static load condition of this modified transmission 66, substantially all of the torque will be supplied by the first turbine 69 and will be transmitted to the output shaft 78 through the gear train 72. Assuming that the torque amplification ratio of the gear train 72 is approximately 2 to 1 and that the amplification ratio of the torque converter is also approximately a 2 to 1 ratio, then the overall ratio for the transmission 66 will be approximately 4 to 1. As the speed of the second turbine 70 increases, it takes over the torque load from the first turbine 69 and when the torque amplification ratio in the converter falls to approximately 1 to 1.6, the reaction member 71 no longer acts as an abutment but runs free. When the first and second turbines reach approximately the same speed of rotation as the pump member 68, the torque converter will operate as a fluid coupling with a one-to-one ratio between the input shaft and the output shaft 90.

Figure 4:
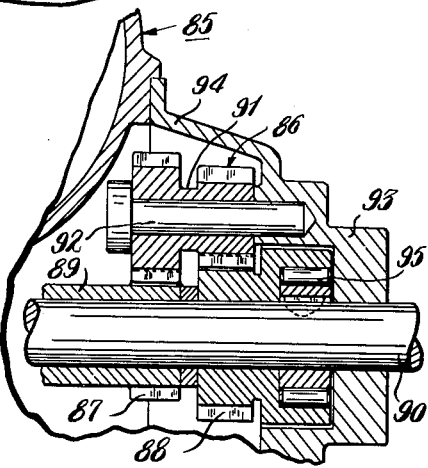
Fig. 4 is a fragmentary longitudinal vertical section corresponding with the gear train portion of Fig. 3 but showing another modified construction.

Fig. 4 of the drawings shows another modified form of power transmitting mechanism 85 which is generally similar to the above-described mechanism 66 of Fig. 3 and includes a mechanical gear train 86 of which the pair of gear members 87 and 88 are connected respectively with the first and second turbines through the hollow outer shaft 89 and the inner output shaft 90. In this modified transmission 85, the cluster gears 91 of the gear train 86 do not revolve about the gear members 87 and 88, but are rotatably supported by fixed pivot pins 92 which are mounted in the hub portion 93 of the stationary housing member 94. The gear member 87 is connected in fixed relation with the hollow shaft 89 adjacent the end of the latter but the gear member 88 is connected with the output shaft 90 through a one-way brake 95.

When high-amplification torque is being delivered to the load through the hollow shaft 89 from the first turbine, the torque is transmitted from this hollow shaft to the output shaft 90 through the cluster gears 91, the gear member 88, and through the one-way brake 95 which at this time connects the latter gear member in driving relation with the output shaft. When the torque load is taken over by the second turbine and torque is being delivered to the load only through the output shaft 90, the one-way brake 95 will permit the gear member 88 to rotate idly on this shaft, at which time the reduction gearing 86 will be substantially ineffective and the first turbine will be permitted to run freely at substantially the same speed as the pump member.

From the foregoing description and the accompanying drawings, it will now be readily understood that this invention provides torque transmitting mechanism of a very practical and satisfactory form and in which the important advantages of high and low-speed turbine members is achieved, as well as the advantages of a mechanical gear train of a very simple form in combination with such multiple turbines.

Although the improved power transmitting mechanism has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a transmission mechanism; cooperating rotatable bladed annular members defining a toroidal fluid circuit including a pump means, a first turbine, a second turbine and a reaction means; rotatable power input means connected with said pump means; output shaft means comprising a pair of shaft members connected respectively with said first and second turbines to be driven thereby and one of which shaft members has a power delivery portion; a gear train interconnecting said shaft members comprising a pair of gears secured to said shaft members and a cluster gear meshing with said pair of gears; said reaction means having a relatively free forward rotation but being inhibited automatically against reverse rotation and being effective while thus inhibited for increasing the torque output of said turbines; rotatable carrier means in surrounding coaxial relation to said output shaft means and supporting said cluster gear for rotation about the cluster gear axis and for revolution about said pair of gears; and holding means effective on said carrier means for preventing rotation thereof in one direction, said holding means being effective on the outer end of said carrier means and said reaction means being connected with the inner end of said carrier means.

2. In a transmission mechanism; cooperating rotatable bladed annular members defining a toroidal fluid circuit including a pump means, a first turbine, a second turbine and a reaction means; rotatable power input means connected with said pump means; output shaft means comprising a pair of shaft members connected respectively with said first and second turbines to be driven thereby and one of which shaft members has a power delivery portion; a gear train interconnecting said shaft members comprising a pair of gears secured to said shaft members and a cluster gear meshing with said pair of gears; said reaction means having a relatively free forward rotation but being inhibited automatically against reverse rotation and being effective while thus inhibited for increasing the torque output of said turbines; rotatable carrier means supporting said cluster gear for rotation about the cluster gear axis and for revolution about said pair of gears; holding means effective on said carrier means for preventing reverse rotation thereof; and means connecting said reaction means with said carrier means.

3. In a transmission mechanism; cooperating rotatable bladed annular members defining a toroidal fluid circuit including a pump means, a first turbine, a second turbine and a reaction means; said first and second turbines being located adjacent the delivery portion of said pump means in said fluid circuit and said reaction means being located between said turbines and said pump means; rotatable power input means connected with said pump means; output shaft means comprising a pair of shaft members connected respectively with said first and second turbines to be driven thereby and one of which shaft members has a power delivery portion; a gear train interconnecting said shaft members comprising a pair of gears secured to said shaft members and a cluster gear meshing with said pair of gears; said reaction means having a relatively free forward rotation but being inhibited automatically against reverse rotation and being effective while thus inhibited for increasing the torque output of said turbines; rotatable carrier means supporting said cluster gear for rotation about the cluster gear axis and for revolution about said pair of gears; holding means effective on said carrier means for preventing reverse rotation thereof; and means connecting said reaction means with said carrier means.

References Cited in the file of this patent

UNITED STATES PATENTS

| | | |
|---|---|---|
| 2,284,123 | Breer et al. | May 26, 1942 |
| 2,316,390 | Biermann | Apr. 13, 1943 |
| 2,671,357 | Foley | Mar. 9, 1954 |